United States Patent
Bhutani et al.

(10) Patent No.: US 9,945,711 B2
(45) Date of Patent: Apr. 17, 2018

(54) INFRARED SENSOR ASSEMBLY FOR INGREDIENT LEVEL DETECTION IN BEVERAGE DISPENSERS

(71) Applicant: PepsiCo, Inc., Purchase, NY (US)

(72) Inventors: Gurmeet Bhutani, Gurgaon (IN); Sandeep Jain, Gurgaon (IN); Vishvendra Tomar, Ghaziabad (IN)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 15/422,176

(22) Filed: Feb. 1, 2017

(65) Prior Publication Data
US 2017/0227394 A1    Aug. 10, 2017

(30) Foreign Application Priority Data
Feb. 5, 2016    (IN) .............................. 201641004142

(51) Int. Cl.
*B67D 1/00*    (2006.01)
*G01F 23/292*  (2006.01)

(52) U.S. Cl.
CPC ....... *G01F 23/2924* (2013.01); *B67D 1/0078* (2013.01)

(58) Field of Classification Search
CPC .......................... G01F 23/2924; B67D 1/0078
See application file for complete search history.

(56) References Cited

U.S. PATENT DOCUMENTS

| | | | |
|---|---|---|---|
| 6,761,284 B2 | 7/2004 | Knepler | |
| 2004/0011807 A1* | 1/2004 | Knepler | B67D 1/1247 222/67 |
| 2009/0008409 A1* | 1/2009 | Verhoeven | G01F 23/2921 222/64 |
| 2010/0161140 A1 | 6/2010 | Majer | |
| 2010/0186499 A1 | 7/2010 | Ramus et al. | |
| 2010/0229973 A1 | 9/2010 | Lang et al. | |

(Continued)

FOREIGN PATENT DOCUMENTS

WO    WO 2015/102489 A1    7/2015

OTHER PUBLICATIONS

International Search Report and Written Opinion of the International Searching Authority for International Application No. PCT/US17/16185, dated Jun. 1, 2017.

*Primary Examiner* — Mark R Gaworecki
(74) *Attorney, Agent, or Firm* — Sterne, Kessler, Goldstein & Fox P.L.L.C.

(57) ABSTRACT

A beverage dispenser ingredient level detection system is disclosed. The system may include a container with a wall, a canister, a capsule, an infrared emitter, and an infrared receiver. The canister may be disposed within the container at a first distance from the wall and may be configured to hold a beverage ingredient. The capsule may be disposed on an interior surface of the wall. The infrared emitter and the infrared receiver may be disposed within the capsule and the infrared receiver may be configured to transmit infrared light rays and the infrared receiver may be configured to detect infrared light rays reflected by the beverage ingredient in the canister to determine whether a pre-determined amount of the beverage ingredient is within the canister. The capsule may absorb infrared light rays that are not indicative of whether the pre-determined amount of the beverage ingredient is within the canister.

19 Claims, 17 Drawing Sheets

(56) References Cited

U.S. PATENT DOCUMENTS

2011/0121181 A1 5/2011 Costello et al.
2015/0115138 A1* 4/2015 Heng .................... G01J 1/0407
250/216

* cited by examiner

INFRARED SENSOR ASSEMBLY FOR INGREDIENT LEVEL DETECTION IN BEVERAGE DISPENSERS

BACKGROUND

Field

Embodiments of the present invention relate generally to ingredient level detection in beverage dispensers, and more specifically to infrared sensor assemblies for ingredient level detection.

Background

Beverage dispensers may dispense beverages that are made within the dispenser by mixing two or more ingredients, such as water and a concentrate ingredient. The ingredients may be stored in canisters and a single dispenser may contain multiple canisters, each associated with various beverages or flavors. When the concentrate ingredient falls below a certain level, the produced beverage is diluted, leading to poor taste and customer dissatisfaction.

BRIEF SUMMARY OF THE INVENTION

One aspect of the invention provides a beverage dispenser ingredient level detection system including a container having a wall, a first canister disposed within the container at a first distance from the wall and configured to hold a first beverage ingredient, a first capsule disposed on an interior surface of the wall, a first infrared emitter disposed within the first capsule and configured to transmit infrared light rays, and a first infrared receiver disposed within the first capsule and configured to detect infrared light rays reflected by the first beverage ingredient in the first canister to determine whether a pre-determined amount of the first beverage ingredient is within the first canister. The first capsule may absorb infrared light rays that are not indicative of whether the pre-determined amount of the first beverage ingredient is within the first canister.

In some embodiments, the first canister is opaque. In some embodiments, the first infrared emitter has an angle of half intensity between about 15 degrees and about 30 degrees. In some embodiments, the first infrared receiver has an angle of half intensity of at least about 15 degrees.

In some embodiments, the beverage dispenser ingredient level detection system also includes a second canister disposed within the container at the first distance from the wall and configured to hold a second beverage ingredient, a second capsule disposed on the interior surface of the wall, a second infrared emitter disposed within the second capsule and configured to transmit infrared light rays, and a second infrared receiver disposed within the second capsule and configured to detect infrared light rays reflected by the second beverage ingredient in the second canister to determine whether a pre-determined amount of the second beverage ingredient is within the second canister, The second capsule may absorb infrared light rays that are not indicative of whether the pre-determined amount of the second beverage ingredient is within the second canister.

In some embodiments, the first capsule absorbs light reflected from the second beverage ingredient in the second canister and the second capsule absorbs light reflected from the first beverage ingredient in the first canister. In some embodiments, the second canister is disposed adjacent to the first canister. In some embodiments, the second canister is disposed less than about 10 millimeters from the first canister. In some embodiments, the second canister is disposed less than about 5 millimeters from the first canister.

According to one aspect, a beverage dispenser ingredient level detection system includes a container having a wall, a first canister disposed within the container at a first distance from the wall and configured to hold a first beverage ingredient, a second canister disposed within the container at the first distance from the wall and configured to hold a second beverage ingredient, a first capsule disposed on an interior surface of the wall, a second capsule disposed on the interior surface of the wall, a first infrared emitter disposed within the first capsule and configured to transmit infrared light rays, a first infrared receiver disposed within the first capsule and configured to detect infrared light rays reflected by the first beverage ingredient in the first canister to determine whether a pre-determined amount of the first beverage ingredient is within the first canister, a second infrared emitter disposed within the second capsule and configured to transmit infrared light rays, a second infrared receiver disposed within the second capsule and configured to detect infrared light rays reflected by the second beverage ingredient in the second canister to determine whether a pre-determined amount of the second beverage ingredient is within the second canister. The first capsule may absorb infrared light rays from the second infrared emitter.

According to one aspect, a beverage dispenser sensor assembly device includes an outer capsule disposed within a container configured for holding canisters of powder, the outer capsule having side walls and a front wall with two holes therein. The beverage dispenser sensor assembly device also may include a circuit board coupled to the outer capsule, the circuit board and the outer capsule forming an enclosure, an infrared emitter disposed on the circuit board within the enclosure and aligned with one of the two holes, an infrared receiver disposed on the circuit board within the enclosure and aligned with the other of the two holes, and a partition disposed between the infrared emitter and the infrared receiver.

In some embodiments, the beverage dispenser sensor assembly device also includes two tabs coupled to the side walls, wherein each tab has a slot therein configured for receiving a fastener. In some embodiments, the two holes are each surrounded by a beveled edge. In some embodiments, positions of the infrared emitter and infrared receiver relative to the outer capsule are adjustable. In some embodiments, the beverage dispenser sensor assembly device also includes a mounting hole in the circuit board disposed between the infrared emitter and the infrared receiver, and an inner thread disposed on an interior surface of the front wall of the outer capsule. In some embodiments, the circuit board is coupled to the outer capsule with a fastener that extends through the mounting hole and interfaces with the inner thread.

In some embodiments, positions of the infrared emitter and the infrared receiver relative to the outer capsule are adjustable by adjusting the number of washers disposed between the circuit board and the outer capsule. In some embodiments, the partition and the outer capsule comprise plastic. In some embodiments, the partition and the outer capsule are black.

According to one aspect, a method for detecting a level of a beverage ingredient includes transmitting light towards a canister from an infrared emitter disposed within a capsule, wherein the infrared emitter has an angle of half intensity of no more than about 30 degrees, detecting the light reflected from a beverage ingredient in the canister at an infrared receiver disposed within the capsule, measuring an intensity of the light detected at the infrared receiver, determining whether the intensity of the light detected at the infrared receiver is less than a threshold value, and providing an alert that an ingredient level in the canister has fallen below a minimum level.

In some embodiments, the method also includes preventing dispensing of a beverage when the intensity of the light detected at the infrared receiver is less than the threshold value. In some embodiments, the alert is a visual alert. In some embodiments, the alert is an audible alert.

According to one aspect, a method for detecting a level of a beverage ingredient includes determining the beverage ingredient contained within a canister, vertically adjusting a sensor assembly device to be aligned with a minimum level based on the beverage ingredient contained within the canister, wherein the minimum level represents a minimum amount of the beverage ingredient in the canister required to produce a beverage, transmitting light towards a canister from an infrared emitter disposed within a capsule, wherein the infrared emitter has an angle of half intensity of no more than about 30 degrees, detecting the light reflected from the beverage ingredient in the canister at an infrared receiver disposed within the capsule, measuring an intensity of the light detected at the infrared receiver, determining whether the intensity of the light detected at the infrared receiver is less than a threshold value, and providing an alert that an ingredient level in the canister has fallen below a minimum level.

In some embodiments, the method also includes adjusting a distance between the infrared emitter and infrared receiver and the canister. In some embodiments, the method also includes sending a value of the measured intensity of the light detected at the infrared receiver to a main controller, wherein the threshold value is stored at the main controller, and wherein determining whether the intensity of the light detected at the infrared receiver is less than the threshold value occurs at the main controller.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Features and advantages of the embodiments will become more apparent from the detailed description set forth below when taken in conjunction with the drawings, in which like reference characters identify corresponding elements throughout.

DETAILED DESCRIPTION OF THE INVENTION

Figure 1:
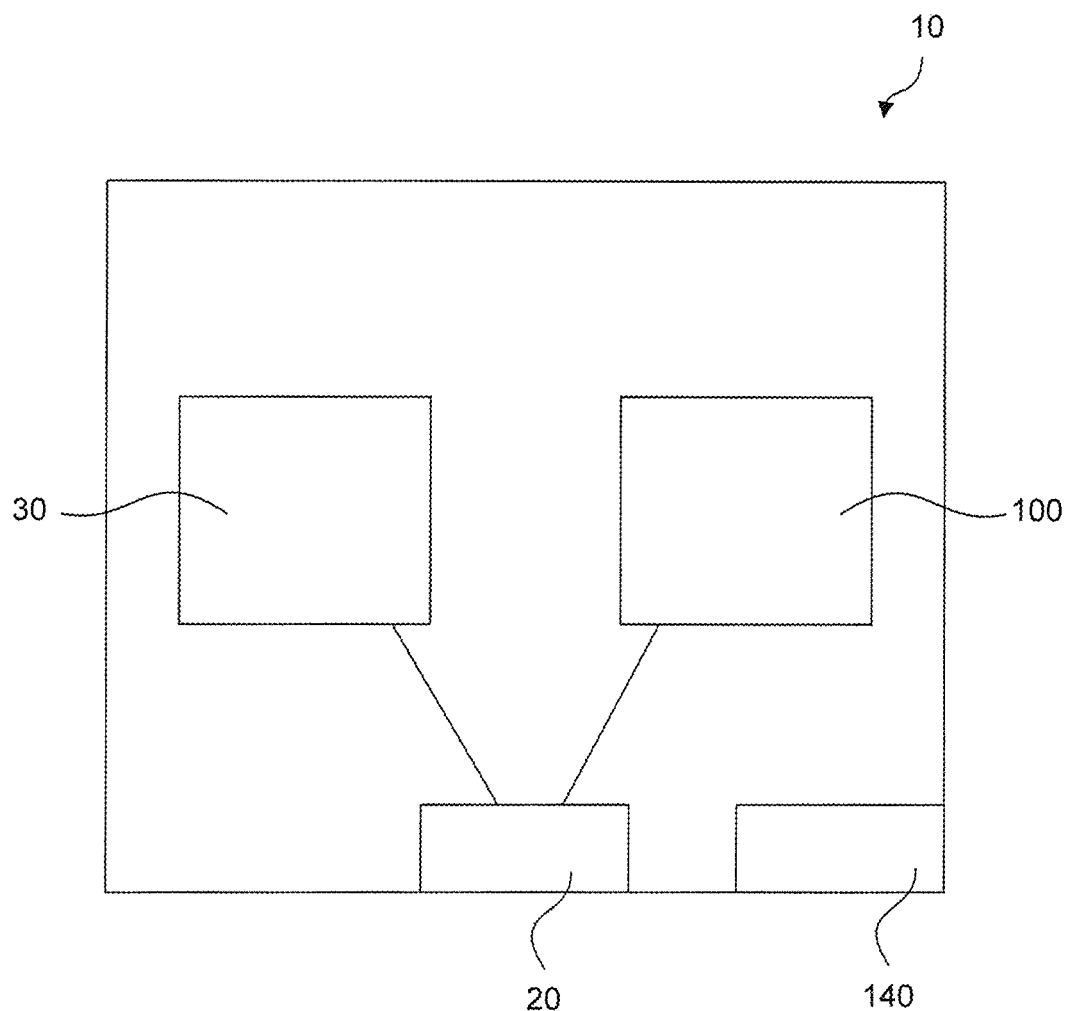
FIG. 1 is a schematic diagram of a beverage dispensing system according to some embodiments.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Beverage dispensing systems can mix two or more ingredients to produce various beverages from a single beverage dispenser. For example, many beverage dispensers have a single water line and multiple containers or canisters that hold a concentrate ingredient. The concentrate ingredient can be in the form of a liquid, syrup, or powder, for example. To produce the desired beverage, a certain amount of the concentrate ingredient can be mixed with water. If less of the concentrate ingredient is used, the beverage is diluted and does not have the desired flavor. Thus, when the concentrate ingredient falls below a certain level, the beverage dispenser will produce a beverage that may have poor taste, which may lead to customer dissatisfaction.

According to some embodiments of the invention, a beverage dispensing system includes an ingredient level detection system. The ingredient level detection system may include one or more sensor assemblies disposed within the beverage dispenser. A sensor assembly may have a signal transmitter and a black body capsule. The signal transmitter provides an infrared emitter that transmits infrared light and an infrared receiver that detects infrared light reflected from a beverage ingredient in a canister. The black body capsule surrounds the signal transmitter and interfaces with the infrared emitter and receiver to reduce the detection of light that is not indicative of whether a canister has a sufficient amount of the beverage ingredient. This may include, but is not limited to, light rays that reflect from a different canister or a beverage ingredient in a different canister, light rays that reflect from a side wall of a container, and light rays that scatter or emit from a different sensor assembly. Each sensor assembly may be aligned with a minimum ingredient level for a canister with a particular ingredient. While the canister has a sufficient amount of the ingredient, the infrared signal reflects from the beverage ingredient in the canister and is detected by the infrared receiver. But when the amount of the ingredient in the canister falls below the minimum threshold level, the infrared receiver does not detect enough infrared light and the sensor assembly thus determines that the canister needs to be refilled or replaced.

In some embodiments, when the ingredient level detection system determines the ingredient has fallen below the minimum threshold, the beverage dispenser produces a signal to alert the consumer and/or the vendor that the canister needs to be refilled or replaced. In some embodiments, the beverage dispenser will not dispense beverages until the canister has been refilled or replaced.

Some embodiments may be used, for example, in a beverage dispenser 10 as shown in the schematic view shown in FIG. 1. Beverage dispenser 10 may include a water line 30, a nozzle 20, and an ingredient level detection system 100. In some embodiments, additional components may be included within beverage dispenser 10. For example, beverage dispenser 10 may include more than one ingredient level detection system 100. Additionally, beverage dispenser 10 may include a carbonated water line. In some embodiments, beverage dispenser 10 may include a display 140.

Beverage dispenser 10 may be configured to dispense only a single beverage or may be configured to dispense a variety of beverages. According to some embodiments, beverage dispenser 10 may dispense carbonated soft drinks, lemonade, tea, coffee, juice, flavored water, or other kinds of beverages. The beverage dispenser 10 may include a heating element and/or a cooling element such that the dispensed beverage may be hot or cold.

As discussed more fully below, ingredient level detection system 100 may contain a concentrate ingredient, including, but not limited to, a liquid, syrup, or powder ingredient. In some embodiments, ingredient level detection system 100 includes multiple concentrate ingredients in separate containers. The various ingredients may be mixed together for example, a powder-based concentrate ingredient may be mixed with water and dispensed from nozzle 20. Ingredient level detection system 100, according to some embodiments, as shown, for example, in FIG. 2, includes a container 110, a canister 120, and a sensor assembly 130.

In some embodiments, container 110 provides an outer housing for canister 120. In some embodiments, container 110 is the outer housing for beverage dispenser 10. In other embodiments, container 110 is disposed within an outer housing for beverage dispenser 10. Container 110, according to some embodiments, includes at least a rear wall 112 and one or more side walls 114. In some embodiments, container 110 includes two side walls. In some embodiments, container 110 completely encloses the components within it. In some embodiments, container 110 includes a door that can be opened to allow access to the inside of container 110 for refilling and/or replacing canister 120. In some embodiments, container 110 only partially encloses the components within it, thus providing access to refill and/or replace canister 120. According to some embodiments, container 110 is made of polypropylene or other food grade plastic.

Figure 2:
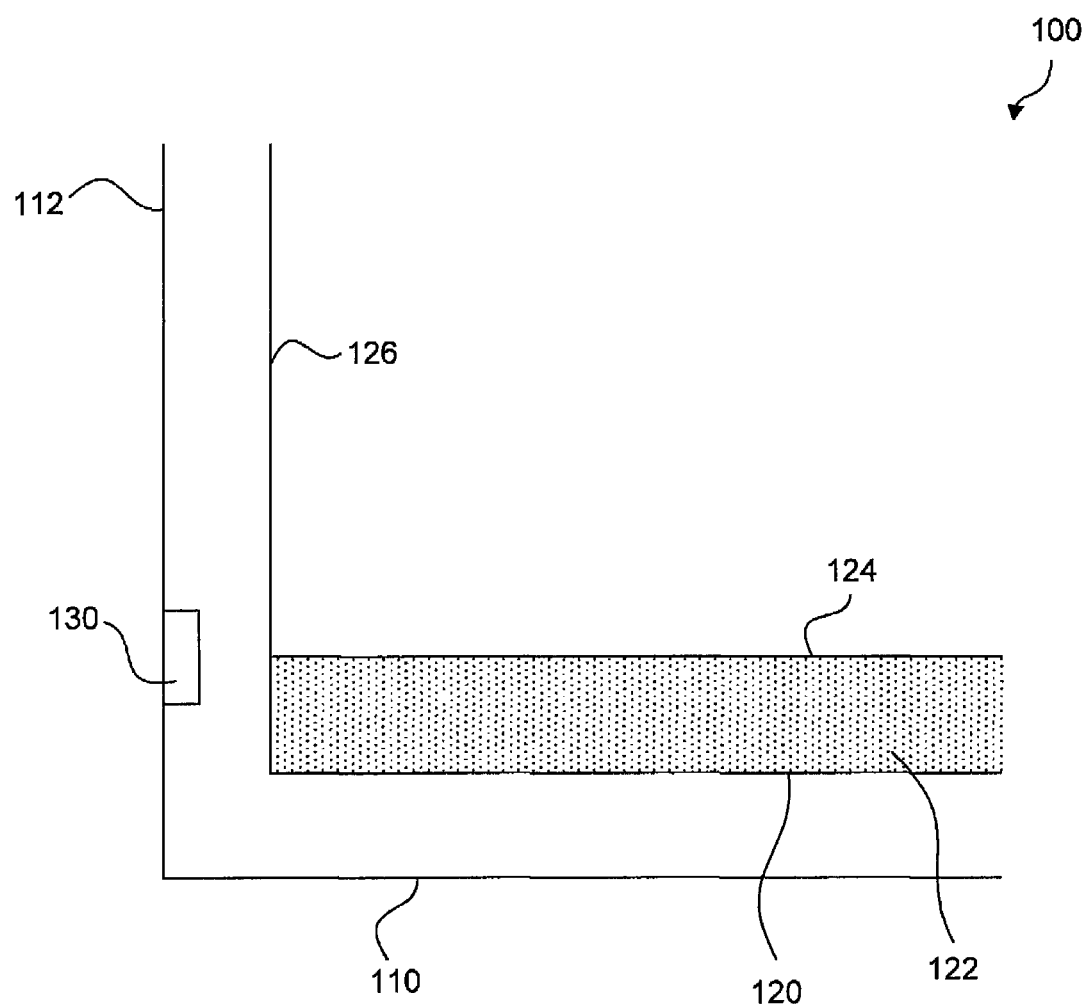
FIG. 2 is a side schematic view of an ingredient level detection system according to some embodiments.

Canister 120, according to some embodiments, is disposed within container 110. Canister 120 may contain a beverage ingredient. In some embodiments, canister 120 may contain a concentrate ingredient. For example, as shown in FIG. 2, canister 120 may contain a powder ingredient 122. In some embodiments, canister 120 is opaque. In other embodiments, canister 120 is transparent or semi-transparent. According to some embodiments, canister 120 is made of polypropylene or other food grade plastic.

As beverage dispenser 10 dispenses beverages, the level of powder ingredient 122 decreases. To make a desired beverage, a certain amount of powder ingredient 122 is required. Thus, canister 120 must contain sufficient powder ingredient 122 to produce the desired beverage. This may be represented by a minimum level 124 of powder ingredient 122 on canister 120. In some embodiments, minimum level 124 is marked on canister 120 by a visual indicator. In some embodiments, minimum level 124 is not marked on canister 120. Different beverages and different powder ingredients 122 may have different minimum levels 124.

Sensor assembly 130, according to some embodiments, is operatively connected to canister 120. In some embodiments, sensors assembly 130 is disposed within container 110. In some embodiments, sensor assembly 130 is disposed on side wall 114. In some embodiments, sensor assembly 130 is disposed on rear wall 112. Sensor assembly 130 may be disposed to be aligned with minimum level 124.

Figure 3:
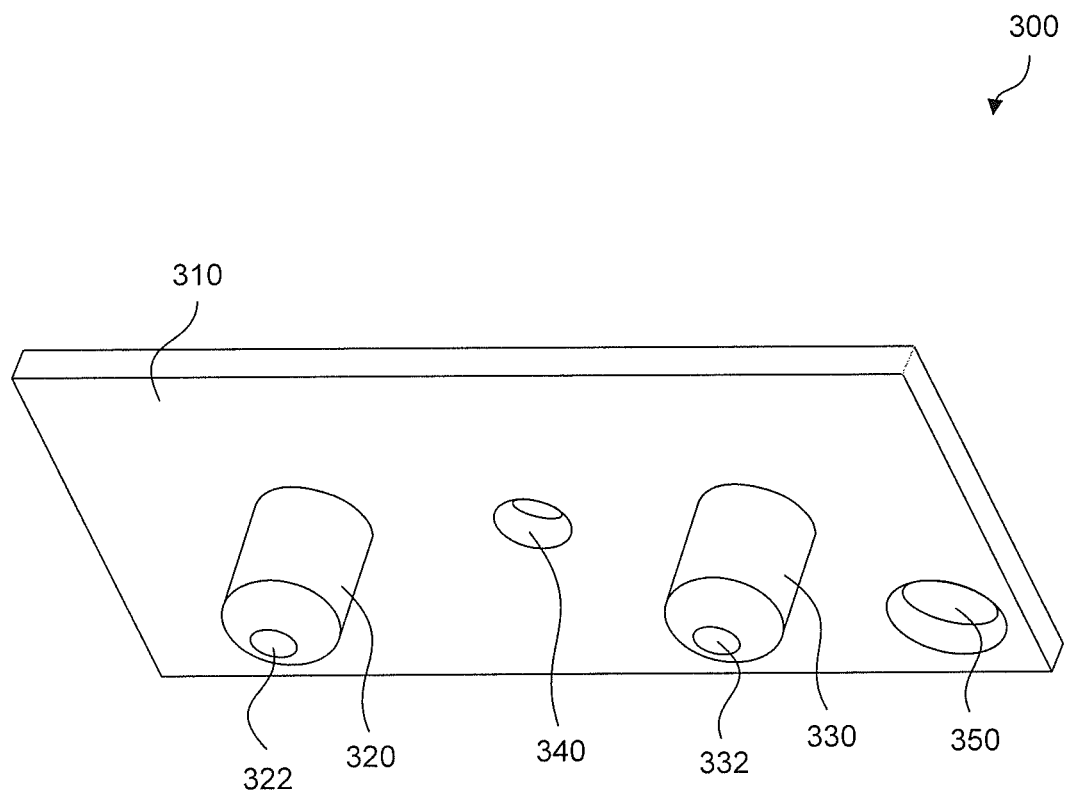
FIG. 3 is a perspective view of a signal transmitter according to some embodiments.
Figure 4:
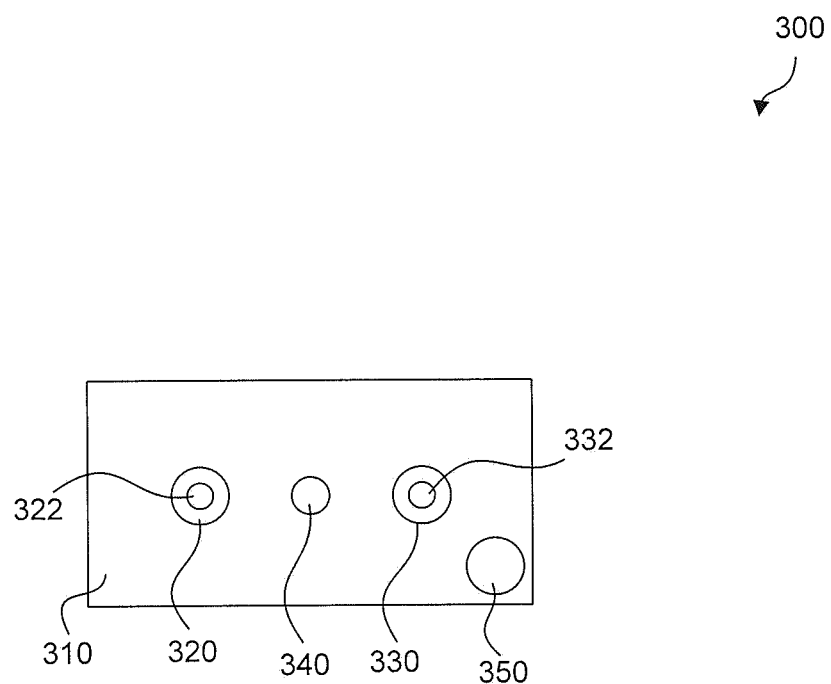
FIG. 4 is a front view of a signal transmitter according to some embodiments.
Figure 5:
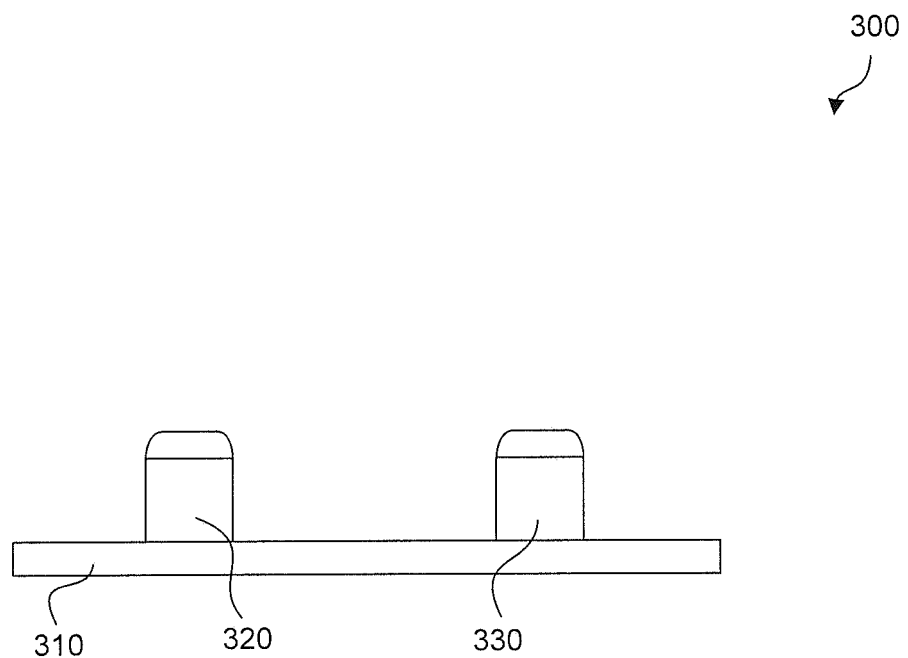
FIG. 5 is a side view of a signal transmitter according to some embodiments.
Figure 9:
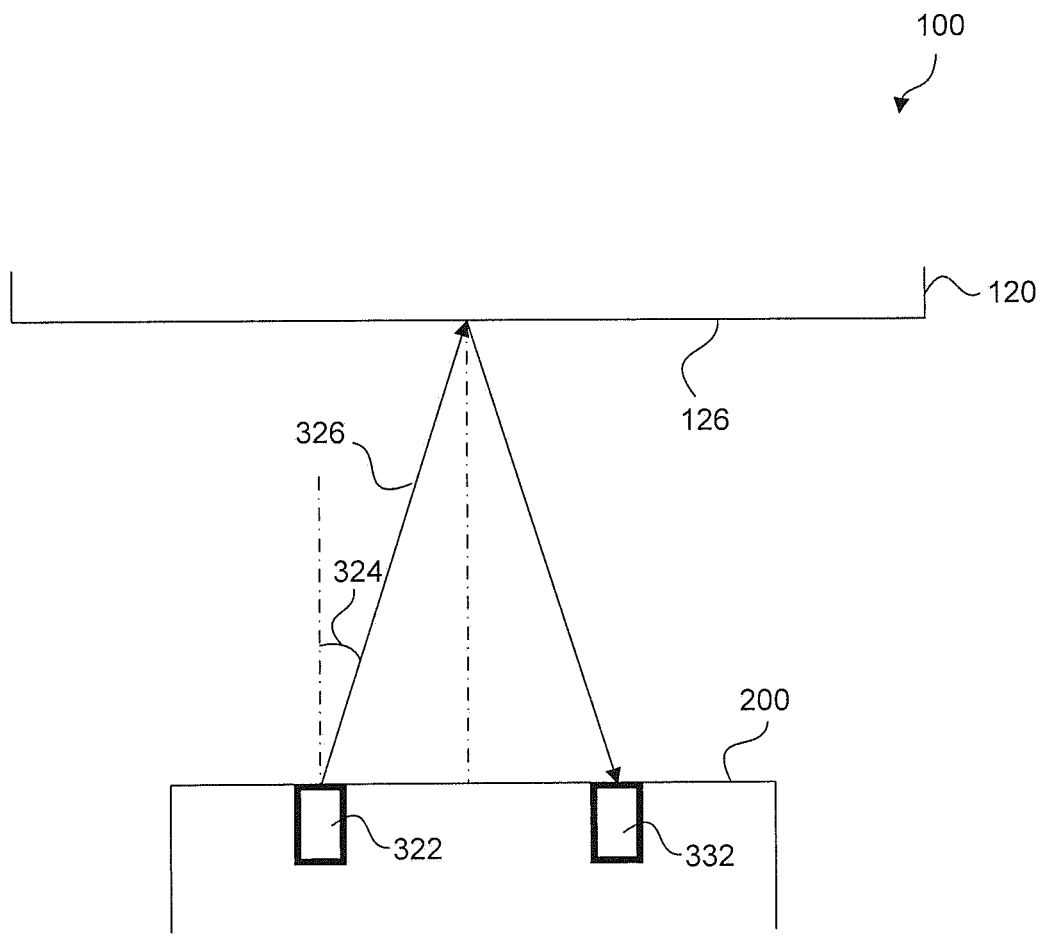
FIG. 9 is a top schematic view of an ingredient level detection system according to some embodiments.

In some embodiments, sensor assembly 130 includes a black body capsule 200 and a signal transmitter 300. For example, as shown in FIGS. 3-5, signal transmitter 300, according to some embodiments, provides structure on which to mount an infrared emitter 322 and an infrared receiver 332. Infrared emitter 322 emits infrared light rays 326 and infrared receiver 332 detects infrared light rays 326 (as shown, for example, in FIG. 9). In some embodiments, infrared emitter 322 transmits infrared light rays having a peak wavelength that allows sensor assembly 130 to operate regardless of ambient light conditions. For example, sensor assembly 130 can operate even if a door of container 110 is open. In some embodiments, infrared emitter 322 transmits infrared light rays 326 having a peak wavelength in the range of about 750-1000 nanometers. In some embodiments, infrared emitter 322 may have an angle of half intensity such that the infrared receiver 332 detects only the infrared light emitted from the associated infrared emitter 322. In some embodiments, infrared emitter 322 may have an angle of half intensity between about 15 degrees and about 30 degrees. In some embodiments, infrared emitter 322 may have an angle of half intensity between about 18 degrees and about 21 degrees. For example, as shown in FIG. 9, infrared emitter 322 may have an angle of half intensity 324 of about 20 degrees. In some embodiments, infrared receiver 332 receives infrared light rays having a peak wavelength that allows sensor assembly 130 to operate regardless of ambient light conditions. For example, sensor assembly 130 can operate even if a door of container 110 is open. In some embodiments, infrared receiver 332 detects infrared light rays 326 having a peak wavelength in the range of about 750-1000 nanometers. In some embodiments, infrared receiver 332 may have an angle of half intensity such that the infrared receiver 332 detects only the infrared light emitted from the associated infrared emitter 322. In some embodiments, infrared receiver 332 may have an angle of half intensity of at least about 15 degrees. In some embodiments, infrared receiver 332 may have an angle of half intensity between about 18 degrees and about 21 degrees.

In some embodiments, signal transmitter 300 includes a board 310. In some embodiments, board 310 mechanically supports and electrically connects components of the sensor assembly 130. In some embodiments, board 310 comprises a circuit board. Board 310 may include all the circuitry associated with sensor assembly 130. Infrared emitter 322 and infrared receiver 332 are disposed on board 310. In some embodiments, the distance between infrared emitter 322 and infrared receiver 332 is such that it allows the infrared receiver 332 to detect only the infrared light emitted from the associated infrared emitter 322. In some embodiments, the distance between infrared emitter 322 and infrared receiver 332 is between about 10 millimeters and about 30 millimeters. For example, the distance between infrared emitter 322 and infrared receiver 332 may be about 20 millimeters.

In some embodiments, signal transmitter 300 includes an infrared emitter cover 320 and an infrared receiver cover 330. Infrared emitter cover 320 and infrared receiver cover 330 are disposed on board 310 and comprise a housing for infrared emitter 322 and infrared receiver 332, respectively. References to infrared emitter 322 may refer both to infrared emitter 322 and infrared emitter cover 320. Similarly, references to infrared receiver 332 may refer both to infrared receiver 332 and to infrared receiver cover 330

In some embodiments, board 310 includes a cable hole 350 that allows the board 310 to be operatively connected to a power source, such as, for example, for a cable that provides power to sensor assembly 130. In some embodiments, the cable is soldered on to the signal transmitter 300. In some embodiments, board 310 does not include a cable hole 350. In some embodiments, the cable is a low voltage cable.

According to some embodiments, board 310 may have a mounting hole 340. In some embodiments, mounting hole 340 is disposed between infrared emitter 322 and infrared receiver 332. Mounting hole 340, in some embodiments, is disposed in the middle of board 310. Mounting hole 340 allows for the mounting of signal transmitter 300 to black body capsule 200. Thus, signal transmitter 300 mounts to black body capsule 200 and black body capsule 200 mounts to rear wall 112 of container 110.

Figure 6:
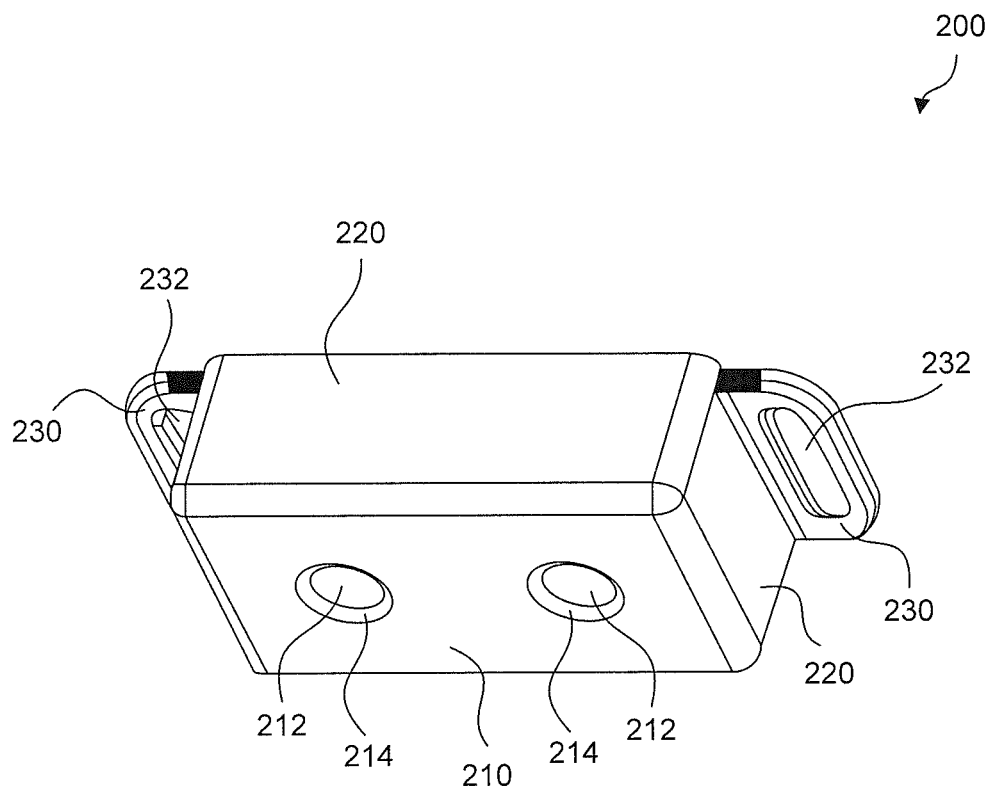
FIG. 6 is a perspective view of a black body capsule according to some embodiments.
Figure 7:
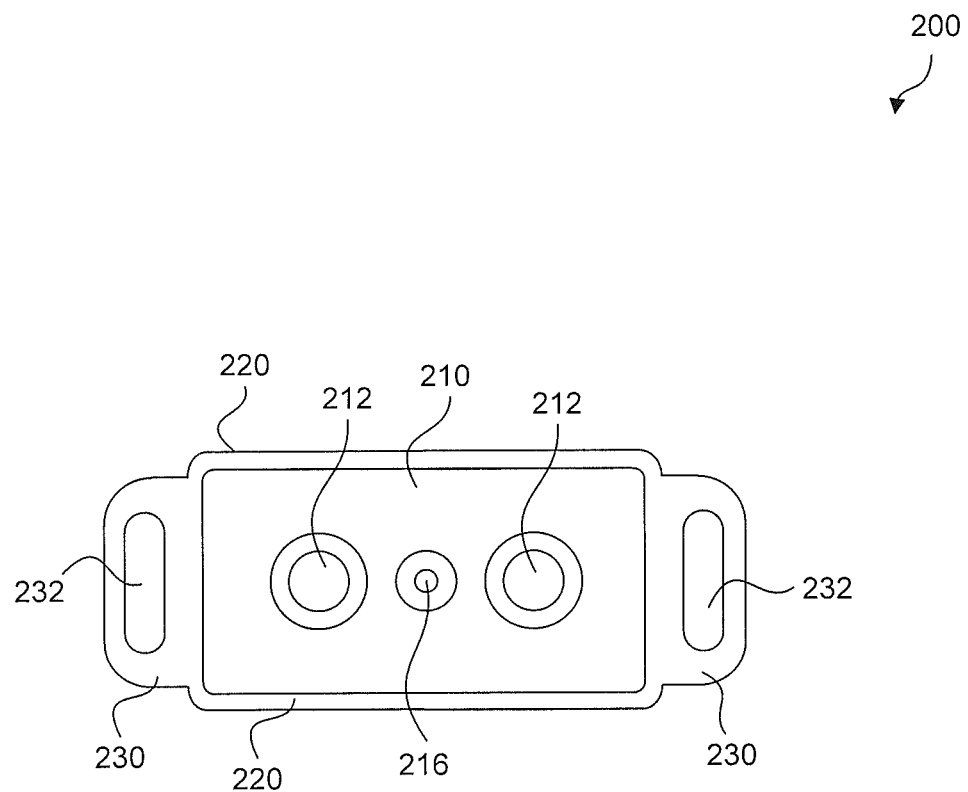
FIG. 7 is a rear view of a black body capsule according to some embodiments.
Figure 8:
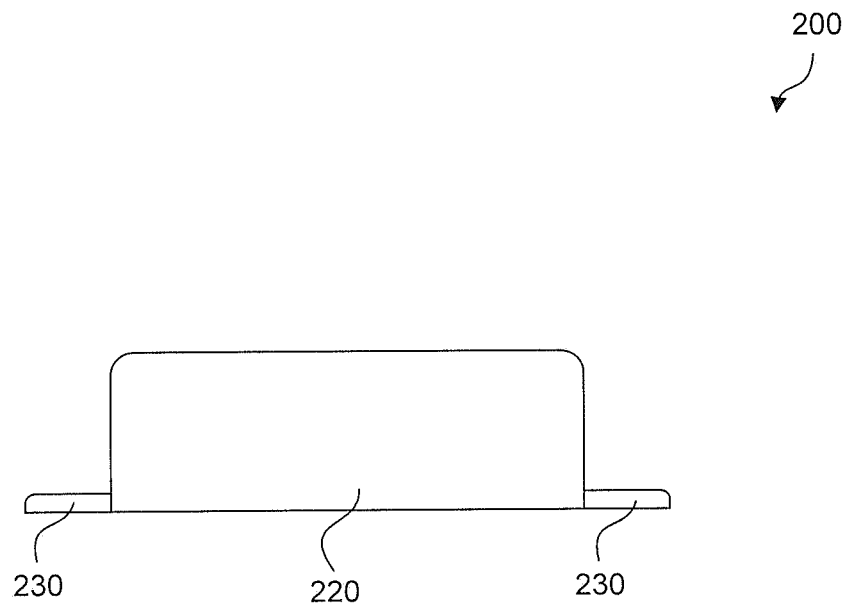
FIG. 8 is a side view of a black body capsule according to some embodiments.

Black body capsule 200, according to some embodiments, surrounds signal transmitter 300. In some embodiments, as shown, for example, in FIGS. 6-8, black body capsule 200 includes a front wall 210, side walls 220, and tabs 230.

In some embodiments, front wall 210 faces canister 120. In some embodiments, the distance between front wall 210 of black body capsule 200 and rear wall 126 of canister 120 is such that it allows infrared light to reflect from a beverage ingredient in canister 120 in a way that provides an accurate determination of whether there is a sufficient amount of the beverage ingredient in canister 120. In some embodiments, the distance between front wall 210 of black body capsule 200 and rear wall 126 of canister 120 is between about 20 millimeters and about 40 millimeters. For example, the distance between front wall 210 of black body capsule 200 and rear wall 126 of canister 120 is about 30 millimeters. Front wall 210 includes holes 212. In some embodiments, front wall 210 includes two holes 212. Holes 212 may be aligned with infrared emitter 322 and infrared receiver 332. Holes 212 may include a beveled edge 214. Beveled edge 214 may limit the maximum angle of half intensity of infrared emitter 322 and infrared receiver 332. For example, beveled edge 214 may block some infrared light rays 326 emitting from infrared emitter 322 and may block some infrared light rays 326 reflecting towards infrared receiver 332.

In some embodiments, front wall 210 includes an inner thread 216 disposed on an inner surface of front wall 210. Inner thread 216 is configured to receive and secure a fastener, such as, for example, a screw or bolt, that extends through mounting hole 340 of board 310. Inner thread, according to some embodiments, affects the position of infrared emitter 322 and infrared receiver within sensor assembly 130. According to some embodiments, infrared emitter 322 and infrared receiver 332 may project to the portion of beveled edge 214 with the smallest diameter, as shown, for example, in FIG. 14. According to some embodiments, infrared emitter 322 and infrared receiver 332 may project through holes 212 in between the portion of beveled edge 214 with the smallest diameter and the front wall 210 of black body capsule 200, as shown, for example, in FIG. 15. According to some embodiments, infrared emitter 322 and infrared receiver 332 may project through holes 212 to be flush with front wall 210 of black body capsule 200 as shown, for example, in FIG. 16.

Figure 12:
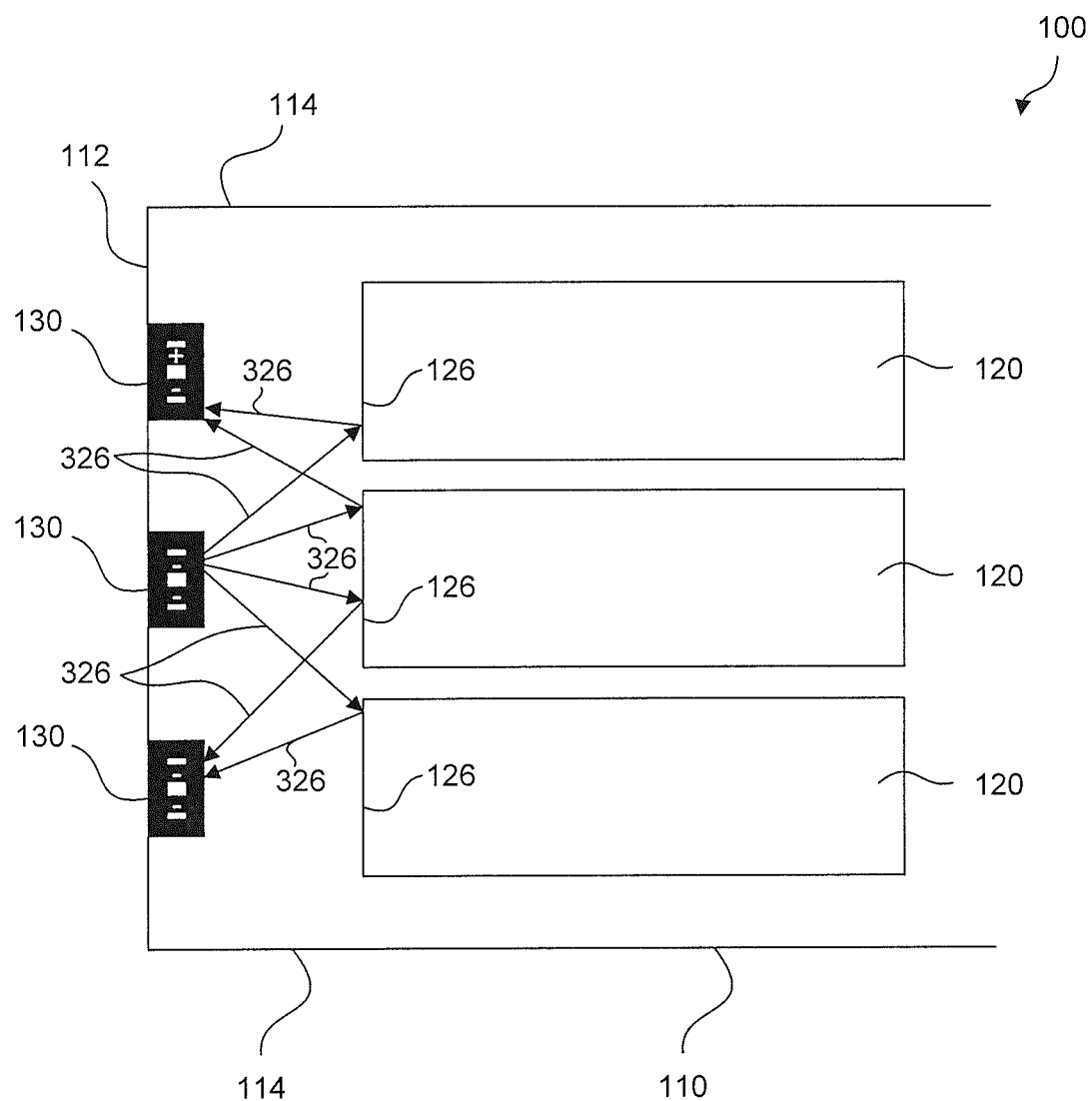
FIG. 12 is a top schematic view of an ingredient level detection system according to some embodiments.
Figure 13:
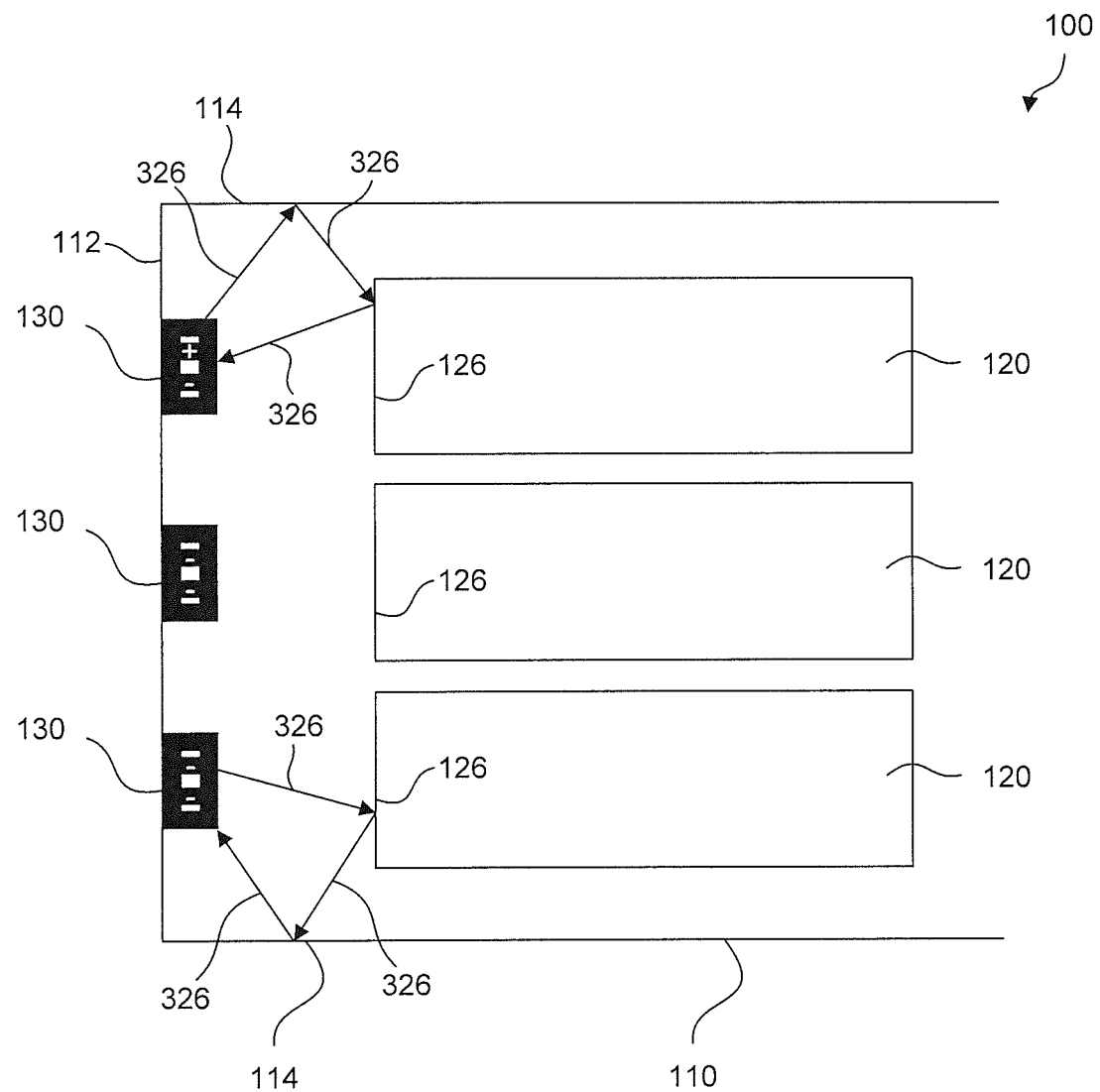
FIG. 13 is a top schematic view of an ingredient level detection system according to some embodiments.

According to some embodiments, black body capsule 200 is made of plastic. For example, black body capsule 200 may be made of polypropylene, acrylonitrile butadiene styrene, or other plastic. In some embodiments, black body capsule 200 is black. According to some embodiments, black body capsule 200, specifically side walls 220 and front wall 210, surround infrared emitter 322 and infrared receiver 332. In some embodiments, black body capsule 200 includes a partition between infrared emitter 322 and infrared receiver 332 to further insulate and enclose infrared emitter 322 and infrared receiver 332. In some embodiments, the partition may be made of plastic. In some embodiments, the partition is black. In some embodiments, the partition comprises infrared emitter cover 320 and/or infrared receiver cover 330. Thus, black body capsule 200 may absorb infrared light rays 326 that may lead to inaccurate results in detecting the powder ingredient 122. For example, black body capsule 200 may absorb infrared light rays 326 reflected from side walls 114 of container 110, as shown, for example, in FIG. 13. As another example, when container 110 includes multiple canisters 120, black body capsule 200 may absorb infrared light rays 326 from an adjacent sensor assembly 130, as shown, for example, in FIG. 12.

Figure 17:
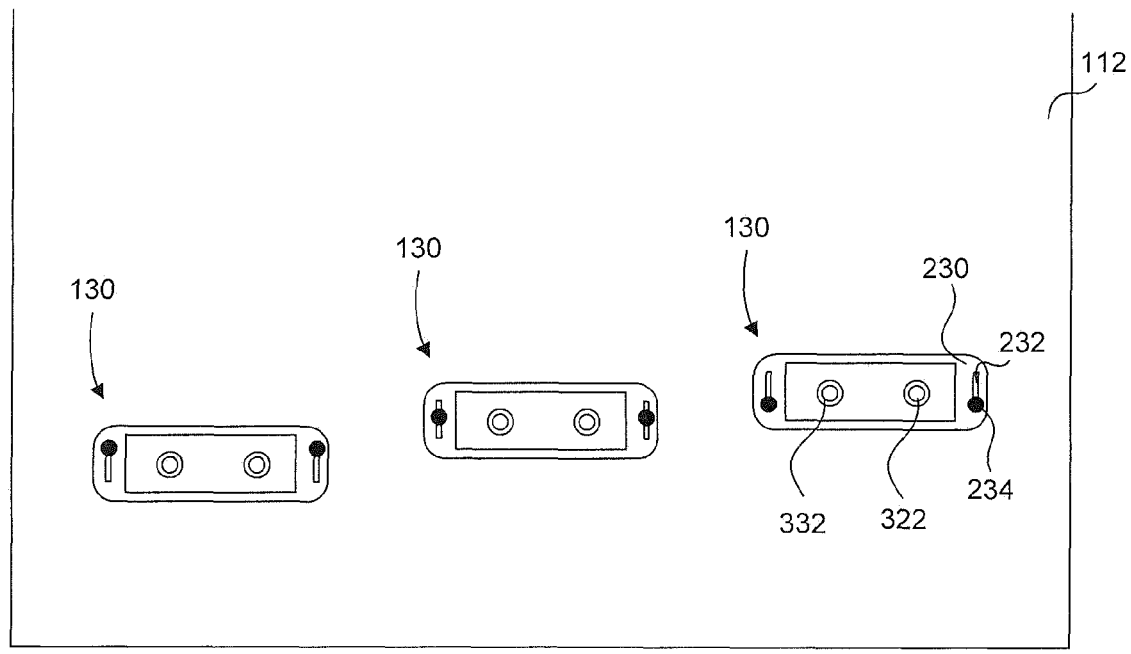
FIG. 17 is a front view of sensor assemblies in a beverage dispenser according to some embodiments.

In some embodiments, tabs 230 are used to mount black body capsule 200 to container 110. Tabs 230 may include slots 232, for example, as shown in FIG. 17. In some embodiments, fasteners 234 extend through slots 232 to mount black body capsule 200 to container 110.

The mounting of black body capsule 200 to container 110 and the mounting of signal transmitter 300 to black body capsule 200 allow for adjusting the position of the sensor assembly 130 relative to the container 110, including adjusting the height of infrared emitter 322 and infrared receiver 332 and adjusting the distance between infrared emitter 322 and infrared receiver 332 and the rear wall 126 of canister 120.

As shown in FIG. 17, slots 232 allow for the entire sensor assembly 130 to be adjusted up and down within a range. This adjustability permits sensor assembly 130 to be used for various canisters 120 with various powder ingredients 122 that may have different minimum levels 124. For example, the minimum level 124 for a lemon powder may be different than the minimum level 124 for an orange powder. Sensor assembly 130 may be adjusted to accommodate either one of these minimum levels.

Figure 14:
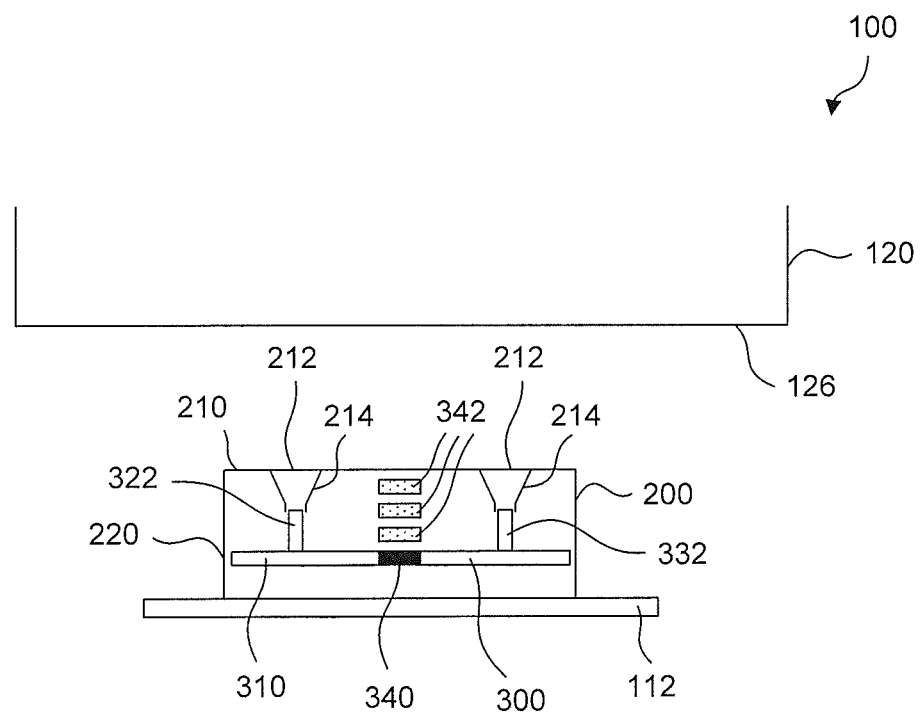
FIG. 14 is a top schematic view of an ingredient level detection system according to some embodiments.
Figure 15:
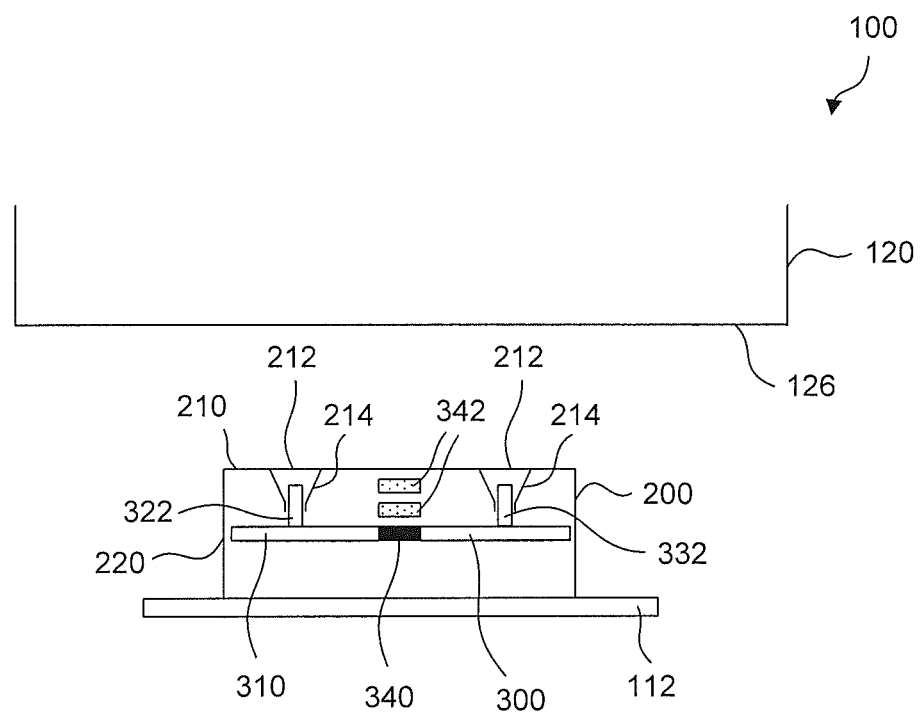
FIG. 15 is a top schematic view of an ingredient level detection system according to some embodiments.
Figure 16:
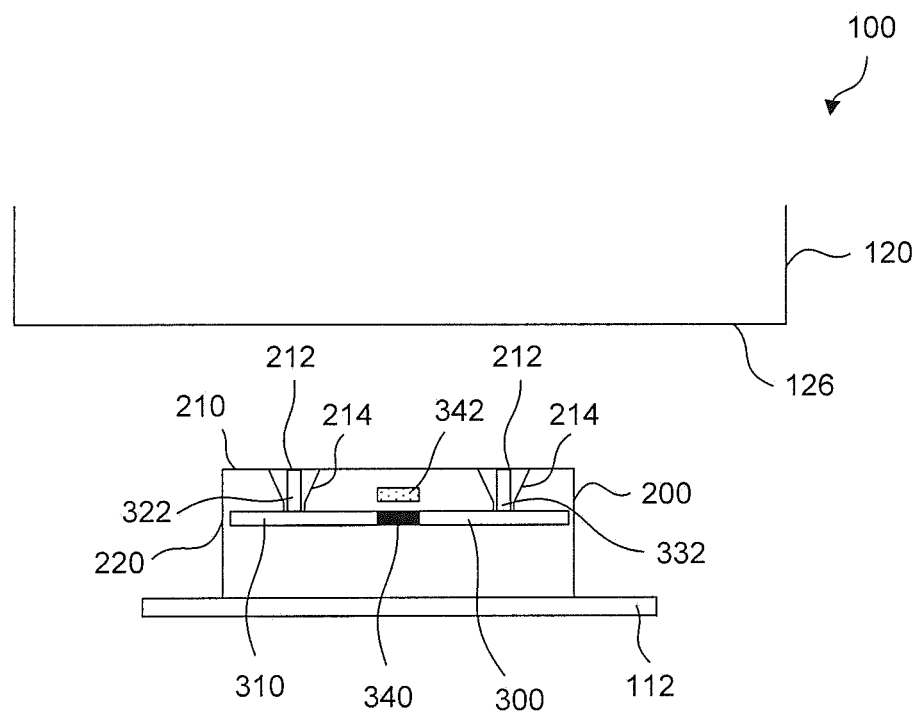
FIG. 16 is a top schematic view of an ingredient level detection system according to some embodiments.

As shown in FIGS. 14-16, a varying numbers of adjustment elements 342 (such as, for example, shims or washers 342) may be disposed between circuit board 310 and black body capsule 200 when mounting signal transmitter 300 to black body capsule 200 to adjust the distance between infrared emitter 322 and infrared receiver 332 and rear wall 126 of canister 120. In some embodiments, the adjustment elements 342 allow for controlling the maximum angle of half intensity.

Figure 10:
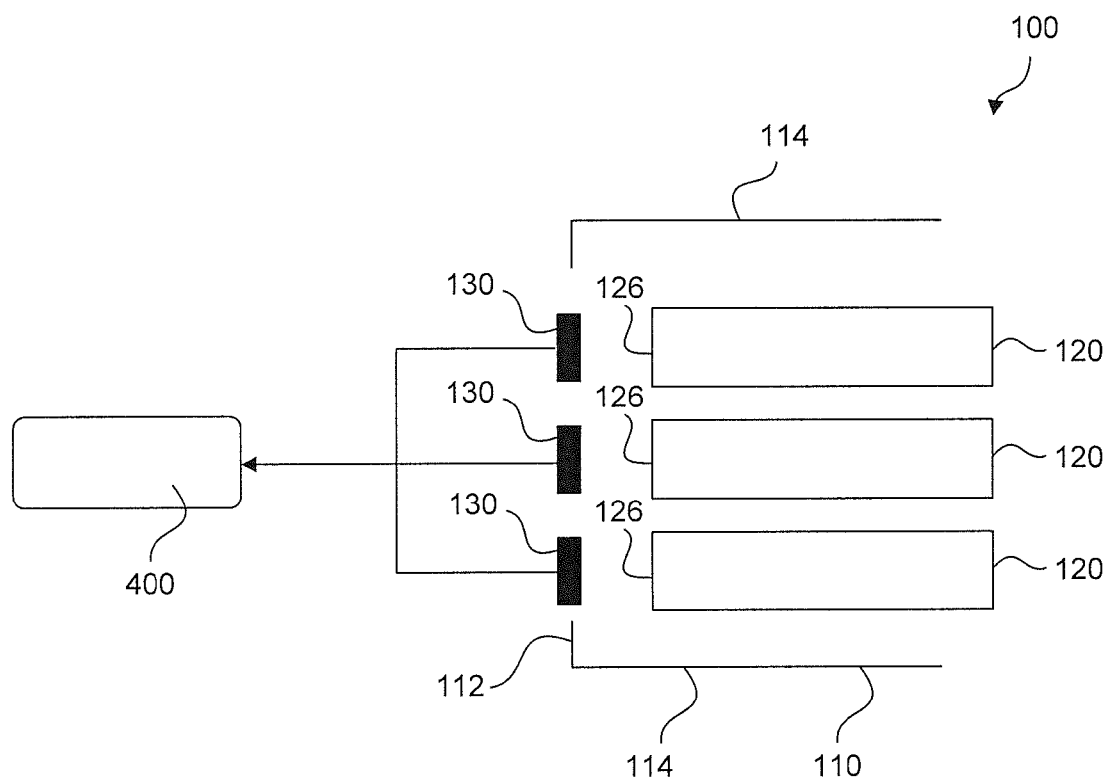
FIG. 10 is a top schematic view of an ingredient level detection system according to some embodiments.

In operation, infrared emitter 322 transmits infrared light rays 326 that reflect from a beverage ingredient at rear wall 126 of canister 120 when powder ingredient 122 is present in canister 120. The reflected rays are detected by infrared receiver 332, which leads to the generation of an electrical signal, which may be sent to a main controller 400, as shown, for example, in FIG. 10. In some embodiments, main controller 400 may be disposed on sensor assembly 130. In some embodiments, main controller 400 is remote from sensor assembly 130. In some embodiments, a single main controller 400 is used for multiple sensor assemblies 130.

Main controller 400 reads the signal based on the intensity of infrared light rays 326 received by infrared receiver 332. If the intensity of the received infrared light rays 326 is more than a threshold or minimum intensity defined in main controller 400, sensor assembly 130 determines that there is powder in canister 120. If the intensity of the received infrared light rays 326 is less than a threshold or minimum intensity defined in main controller 400, sensor assembly 130 determines that the powder in canister 120 has fallen below the minimum level 124. For example, in some embodiments, when powder ingredient 122 is present in canister 120, infrared receiver 332 detects reflected rays and a 5-volt signal is generated. This 5-volt signal is sent to a microcontroller, for example in main controller 400. The microcontroller may then output a high digital signal of 1, which allows for dispensing of a drink based on input from a consumer. When infrared receiver 332 does not detect reflected rays, 0 volts are generated and sent to the microcontroller. The microcontroller thus outputs a low digital signal of 0. In some embodiments, this determination may result in an alarm. The alarm may be presented using a display 140, as shown, for example, in FIG. 1, operatively coupled to the sensor assembly 130. The display 140 may provide a visual or audible alert. For example, this determination may result in a visual alert, such as a light emitting diode turning on. In some embodiments, this determination may result in an audible alert, such as a tone sounding. These and other alerts indicate that canister 120 needs to be refilled or replaced. In some embodiments, this determination may result in beverage dispenser 10 not dispensing any beverages until canister 120 is replaced or refilled.

Figure 11:
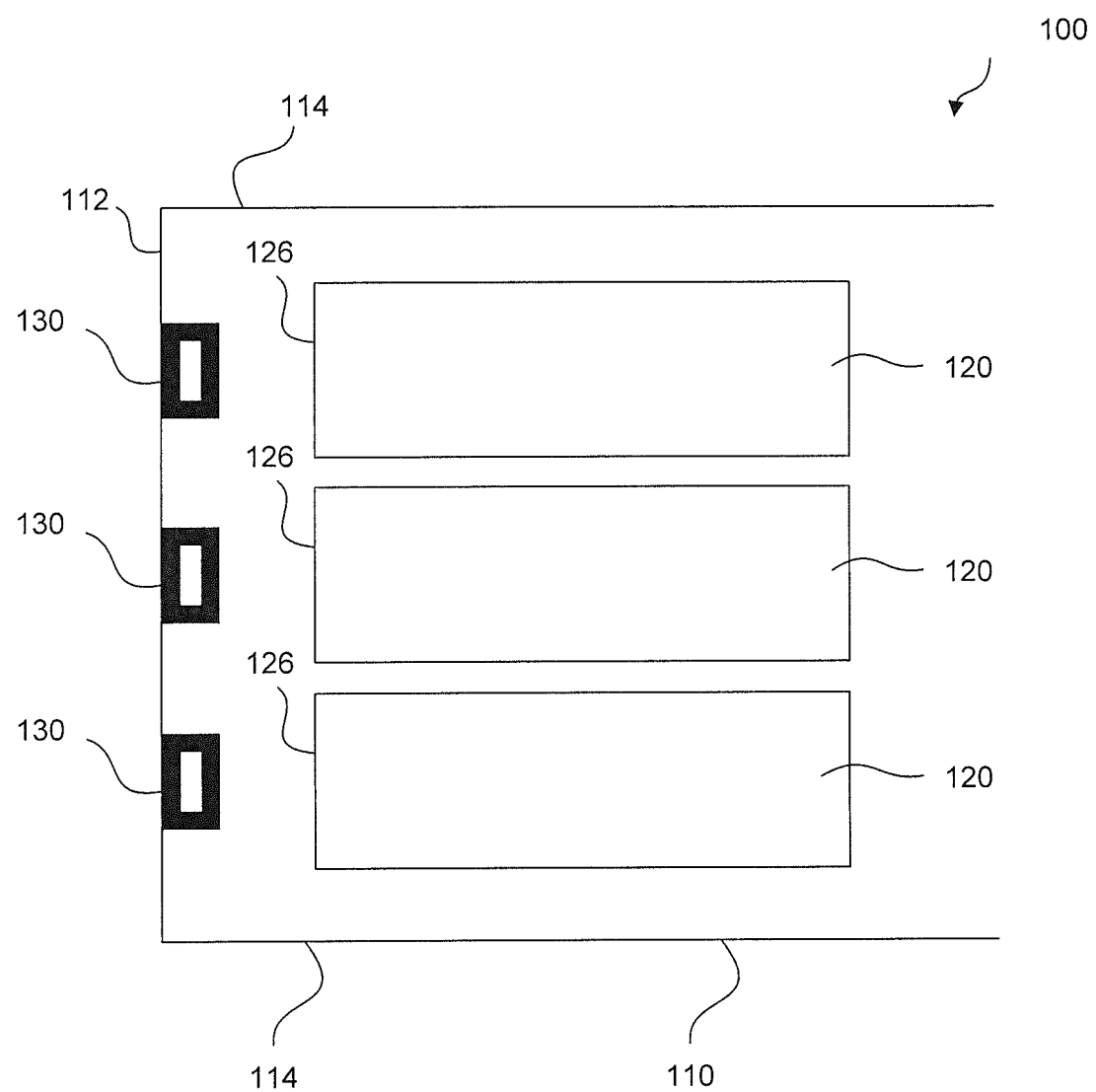
FIG. 11 is a top schematic view of an ingredient level detection system according to some embodiments.

In some embodiments, the configuration of sensor assembly 130, including black body capsule 200 and signal transmitter 300, allows for compact construction of ingredient level detection system 100, particularly when container 110 contains multiple canisters 120, as shown, for example, in FIG. 11. For example, because black body capsule 200 absorbs infrared light rays 326 that are reflected, emitted, or scattered from adjacent sensor assemblies 130, the distance between multiple canisters 120 can be kept to a minimum without interfering with accurate detection of the beverage ingredients. The distance between multiple canisters 120 can also be kept to a minimum because the angle of half intensity for infrared emitter 322 and infrared receiver 332 can be controlled with the beveled edge 214 of holes 212. In some embodiments, the distance between multiple canisters 120 may be less than about 10 millimeters. For example, the distance between multiple canisters 120 may be between about 4 millimeters and about 5 millimeters.

For similar reasons, the distance between canister 120 and side wall 114 of container 110 may be minimized. In some embodiments, the distance between canister 120 and side wall 114 may be less than about 25 millimeters. For example, the distance between canister 120 and side wall 114 may be between about 17 millimeters and about 20 millimeters.

Thus according to some embodiments, a method for detecting a level of a beverage ingredient may include transmitting light towards canister 120 from infrared emitter 322. In some embodiments, infrared emitter 322 is disposed within black body capsule 200. In some embodiments, infrared emitter 322 may have an angle of half intensity of no more than about 30 degrees. In some embodiments, infrared receiver 332 detects light reflected from a beverage ingredient in canister 120. In some embodiments, main controller 400 measures an intensity of the light detected at infrared receiver 332. Main controller 400 may determine whether the intensity of the light detected at infrared receiver 332 is less than a threshold value. The threshold value may be stored at main controller 400. If the intensity is less than the threshold value, then ingredient level detection system 100 provides an alert that an ingredient level has fallen below minimum level 124.

According to some embodiments, in addition to the foregoing operations, the beverage ingredient contained within canister 120 may also be determined. For example, it may be determined that orange powder is contained within canister 120. System 100 may already have the relevant information associated with orange powder. Thus, in some embodiments, sensor assembly 130 may be adjusted to be aligned with minimum level 124 based on the beverage ingredient determined to be in canister 120. This minimum level 124 represents the minimum amount of the ingredient required to be in canister 120 to produce a beverage according to specification.

In some embodiments, the ingredient level detection system 100 prevents dispensing of a beverage when the intensity of the light detected at infrared receiver 332 is less than the threshold value. In some embodiments, the distance between infrared emitter 322 and infrared receiver 332 and canister 120 may be adjusted.

One or more of these operations may be performed by automation. For example, in some embodiments, main controller 400 may include a memory and a processor operatively connected to the memory and a communication network. In some embodiments, canister 120 may include an identification element, such as an RFID tag or QR code. Sensor assembly 130 may include an RFID tag reader or QR code reader. In some embodiments, components of ingredient level detection system 100, such as, for example, canister 120, sensor assembly 130, and display 140 may communicate over a wired or a wireless network. In some embodiments, the components may communicate using a local area network or a wide area network. Thus, one or more of the components, such as display 140, may be remote from the other components. In some embodiments, upon reading the identification of canister 120, sensor assembly 130 may access stored information related to canister 120. The stored information, for example, may be stored in the memory of main controller 400. In some embodiments, sensor assembly 130 includes actuators that move sensor assembly to be at the appropriate minimum level 124 for that particular canister 120. In some embodiments, sensor assembly 130 may include actuators that move board 310 within black body capsule 200 so that infrared emitter 322 and infrared receiver 332 are at an appropriate distance from canister 120 for the particular ingredient therein.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A beverage dispenser ingredient level detection system comprising:
    a container having a wall;
    a first canister disposed within the container at a first distance from the wall and configured to hold a first beverage ingredient;
    a first capsule disposed on an interior surface of the wall;
    a first infrared emitter disposed within the first capsule and configured to transmit infrared light rays; and
    a first infrared receiver disposed within the first capsule and configured to detect infrared light rays reflected by the first beverage ingredient in the first canister to determine whether a pre-determined amount of the first beverage ingredient is within the first canister,
    wherein the first capsule absorbs infrared light rays that are not indicative of whether the pre-determined amount of the first beverage ingredient is within the first canister.

2. The beverage dispenser ingredient level detection system of claim 1, wherein the first canister is opaque.

3. The beverage dispenser ingredient level detection system of claim 1, wherein the first infrared emitter has an angle of half intensity between about 15 degrees and about 30 degrees.

4. The beverage dispenser ingredient level detection system of claim 1, wherein the first infrared receiver has an angle of half intensity of at least about 15 degrees.

5. The beverage dispenser ingredient level detection system of claim 1, further comprising:
    a second canister disposed within the container at the first distance from the wall and configured to hold a second beverage ingredient;
    a second capsule disposed on the interior surface of the wall;
    a second infrared emitter disposed within the second capsule and configured to transmit infrared light rays; and
    a second infrared receiver disposed within the second capsule and configured to detect infrared light rays reflected by the second beverage ingredient in the second canister to determine whether a pre-determined amount of the second beverage ingredient is within the second canister,
    wherein the second capsule absorbs infrared light rays that are not indicative of whether the pre-determined amount of the second beverage ingredient is within the second canister.

6. The beverage dispenser ingredient level detection system of claim 5, wherein the first capsule absorbs light reflected from the second beverage ingredient in the second canister and the second capsule absorbs light reflected from the first beverage ingredient in the first canister.

7. The beverage dispenser ingredient level detection system of claim 5, wherein the second canister is disposed adjacent to the first canister.

8. The beverage dispenser ingredient level detection system of claim 5, wherein the second canister is disposed less than about 10 millimeters from the first canister.

9. A beverage dispenser sensor assembly device comprising:
    an outer capsule disposed within a container configured for holding canisters of powder, the outer capsule having side walls and a front wall with two holes therein, wherein the two holes each comprise a beveled edge;
    a circuit board coupled to the outer capsule, the circuit board and the outer capsule forming an enclosure;
    an infrared emitter disposed on the circuit board within the enclosure and aligned with one of the two holes;
    an infrared receiver disposed on the circuit board within the enclosure and aligned with the other of the two holes; and
    a partition disposed between the infrared emitter and the infrared receiver,
    wherein the beveled edges are configured to block infrared light rays such that the infrared receiver detects only light transmitted from the infrared emitter.

10. The beverage dispenser sensor assembly device of claim 9, further comprising two tabs coupled to the side walls, wherein each tab has a slot therein configured for receiving a fastener.

11. The beverage dispenser sensor assembly device of claim 9, wherein positions of the infrared emitter and infrared receiver relative to the outer capsule are adjustable.

12. The beverage dispenser sensor assembly device of claim 9, further comprising:
    a mounting hole in the circuit board disposed between the infrared emitter and the infrared receiver; and
    an inner thread disposed on an interior surface of the front wall of the outer capsule,
    wherein the circuit board is coupled to the outer capsule with a fastener that extends through the mounting hole and interfaces with the inner thread.

13. The beverage dispenser sensor assembly device of claim 12, wherein positions of the infrared emitter and the infrared receiver relative to the outer capsule are adjustable by adjusting the number of washers disposed between the circuit board and the outer capsule.

14. The beverage dispenser sensor assembly device of claim 9, wherein the partition and the outer capsule comprise plastic.

15. The beverage dispenser sensor assembly device of claim 9, wherein the partition and the outer capsule are black.

16. A method for detecting a level of a beverage ingredient comprising:
   transmitting light towards a canister from an infrared emitter disposed within a capsule;
   detecting the light reflected from a beverage ingredient in the canister at an infrared receiver disposed within the capsule;
   measuring an intensity of the light detected at the infrared receiver;
   determining whether the intensity of the light detected at the infrared receiver is less than a threshold value; and
   providing an alert that an ingredient level in the canister has fallen below a minimum level,
   wherein the infrared emitter and the infrared receiver each have an angle of half intensity of no more than about 30 degrees such that the infrared receiver detects only the light transmitted from the infrared emitter.

17. The method of claim 16, further comprising preventing dispensing of a beverage when the intensity of the light detected at the infrared receiver is less than the threshold value.

18. The method of claim 16, wherein the alert is a visual alert.

19. The method of claim 16, wherein the alert is an audible alert.

* * * * *